(12) United States Patent
Williams

(10) Patent No.: US 9,858,172 B2
(45) Date of Patent: Jan. 2, 2018

(54) APPARATUS AND METHOD FOR CONTROLLING DEBUGGING OF PROGRAM INSTRUCTIONS INCLUDING A TRANSACTION

(71) Applicant: ARM LIMITED, Cambridge (GB)

(72) Inventor: Michael John Williams, Ely (GB)

(73) Assignee: ARM Limited, Cambridge (GB)

( * ) Notice: Subject to any disclaimer, the term of this patent is extended or adjusted under 35 U.S.C. 154(b) by 152 days.

(21) Appl. No.: 15/007,578

(22) Filed: Jan. 27, 2016

(65) Prior Publication Data

US 2016/0239403 A1 Aug. 18, 2016

(30) Foreign Application Priority Data

Feb. 13, 2015 (GB) .................................. 1502421.9

(51) Int. Cl.
*G06F 11/00* (2006.01)
*G06F 11/36* (2006.01)

(52) U.S. Cl.
CPC ...... *G06F 11/3636* (2013.01); *G06F 11/3644* (2013.01)

(58) Field of Classification Search
CPC .......................... G06F 11/3636; G06F 11/3644
See application file for complete search history.

(56) References Cited

U.S. PATENT DOCUMENTS

| | | | |
|---|---|---|---|
| 8,713,371 B2 | 4/2014 | Williams et al. | |
| 8,839,038 B2 | 9/2014 | Williams et al. | |
| 2006/0294326 A1 | 12/2006 | Jacobson et al. | |
| 2008/0005193 A1 | 1/2008 | Lev et al. | |
| 2008/0127035 A1 | 5/2008 | Lev et al. | |
| 2008/0127113 A1* | 5/2008 | Wu ..................... | G06F 11/3644 717/129 |

(Continued)

OTHER PUBLICATIONS

Search Report for GB1502421.9 dated Aug. 10, 2015, three pages.

(Continued)

*Primary Examiner* — Joshua P Lottich

(74) *Attorney, Agent, or Firm* — Nixon & Vanderhye P.C.

(57) ABSTRACT

An apparatus and method are provided for controlling debugging of program instructions that include a transaction, where the transaction is executed on processing circuitry and comprises a number of program instructions that execute to generate updates to state data, and where those updates are only committed if the transaction completes without a conflict. In addition to the processing circuitry, the apparatus has control storage for storing at least one watchpoint identifier, and the processing circuitry is then arranged, when detecting a watchpoint match condition with reference to the at least one watchpoint identifier during execution of a program instruction within the transaction, to create a pending watchpoint debug event. The processing circuitry is then responsive to execution of the transaction finishing to initiate a watchpoint debug event for the pending watchpoint debug event. However, if instead the transaction is aborted before it finishes (due to a conflict arising), the processing circuitry is arranged to cancel the pending watchpoint debug event. Such an approach prevents a probe effect arising during execution of a transaction due to debugging activity.

11 Claims, 8 Drawing Sheets

(56) References Cited

U.S. PATENT DOCUMENTS

| | | | |
|---|---|---|---|
| 2008/0320334 A1 | 12/2008 | Taillefer | |
| 2011/0145798 A1 | 6/2011 | Taillefer et al. | |
| 2011/0302183 A1* | 12/2011 | Van De Vanter | G06F 9/44 707/758 |
| 2012/0278790 A1* | 11/2012 | Bates | G06F 11/3636 717/125 |
| 2015/0039945 A1* | 2/2015 | Moyer | G06F 11/36 714/45 |

OTHER PUBLICATIONS

U.S. Appl. No. 15/007,604, filed Jan. 27, 2016; Inventor: Williams.
Search Report for GB1502423.5 dated Aug. 10, 2015, 3 pages.
Office Action dated Sep. 25, 2017 in co-pending U.S. Appl. No. 15/007,604, 13 pages.

* cited by examiner

APPARATUS AND METHOD FOR CONTROLLING DEBUGGING OF PROGRAM INSTRUCTIONS INCLUDING A TRANSACTION

This application claims priority to GB Patent Application No. 1502421.9 filed 13 Feb. 2015, the entire content of which is hereby incorporated by reference.

BACKGROUND

The present technique relates to an apparatus and method for controlling debugging of program instructions including a transaction.

There may be provided data processing systems supporting transactions in which a number of program instructions execute to generate updates to state data and to commit the updates if the transaction completes without a conflict. Since the updates are only committed if the transaction completes without a conflict, such updates are also referred to herein as speculative updates until such time as they are committed. Such transactions may be used, for example, to facilitate multi-threaded processing using a shared memory in which transactions using data values within the shared memory may be allowed to proceed in parallel relying upon the ability to avoid committing speculative updates should a conflict arise between memory accesses. In most cases, such conflicts do not arise and accordingly the parallel processing proceeds efficiently without the need to support the overhead of more rigid mechanisms, such as the use of memory locks, and yet when a conflict does arise it is possible to recover as the speculative updates to state data will not have been committed.

It is often desired to perform debugging of program instructions executed by processing circuitry, but this can be problematic when those program instructions include transactions of the above type. In particular, when debugging transactions, the action of inspecting the processing circuitry state during a transaction can give rise to a probe effect that influences execution of the remaining portion of the transaction. This probe effect can be quite significant, and for example certain types of debugging activity can cause the transaction to abort, which prevents forward progress in the processing of the transaction.

SUMMARY

In one example arrangement, there is provided an apparatus comprising: processing circuitry to execute program instructions including a transaction comprising a number of program instructions that execute to generate updates to state data and to commit said updates if said transaction completes without a conflict; and control storage to store at least one watchpoint identifier; the processing circuitry being arranged, when detecting a watchpoint match condition with reference to the at least one watchpoint identifier during execution of a program instruction within said transaction, to create a pending watchpoint debug event; the processing circuitry being responsive to execution of the transaction finishing to initiate a watchpoint debug event for the pending watchpoint debug event; and the processing circuitry being responsive to a conflict arising during execution of the transaction to cancel the pending watchpoint debug event.

In another example arrangement, there is provided a debug control method comprising: employing processing circuitry to execute program instructions including a transaction comprising a number of program instructions that execute to generate updates to state data and to commit said updates if said transaction completes without a conflict; storing at least one watchpoint identifier; creating a pending watchpoint debug event on detecting a watchpoint match condition with reference to the at least one watchpoint identifier during execution of a program instruction within said transaction; responsive to execution of the transaction finishing, initiating a watchpoint debug event for the pending watchpoint debug event; and responsive to a conflict arising during execution of the transaction, cancelling the pending watchpoint debug event.

In a yet further example arrangement, there is provided an apparatus comprising: processing means for executing program instructions including a transaction comprising a number of program instructions that execute to generate updates to state data, and for committing said updates if said transaction completes without a conflict; and control means for storing at least one watchpoint identifier; the processing means, when detecting a watchpoint match condition with reference to the at least one watchpoint identifier during execution of a program instruction within said transaction, for creating a pending watchpoint debug event; the processing means, responsive to execution of the transaction finishing, for initiating a watchpoint debug event for the pending watchpoint debug event; and the processing means, responsive to a conflict arising during execution of the transaction, for cancelling the pending watchpoint debug event.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
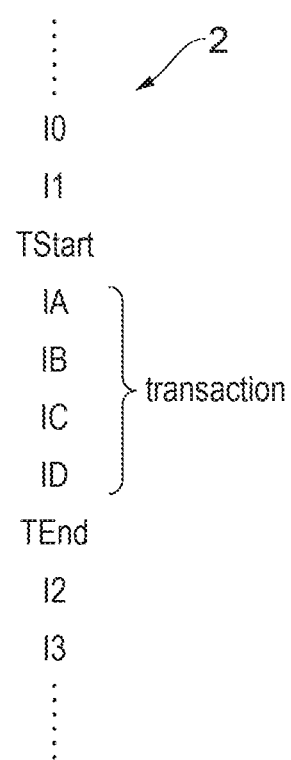
FIG. 1 schematically illustrates a stream of program instructions including a transaction.

Before discussing the embodiments with reference to the accompanying figures, the following description of embodiments is provided.

Within processing systems which support transactions, such as systems incorporating transactional memory, a number of program instructions execute to generate speculative updates to state data (e.g. architectural state data) and operate to permit (commit) those speculative updates if the transaction concerned completes without a conflict. As an example, a transaction may include load or store operations to memory locations and if those load and store operations complete without an access from outside the transaction attempting to make a conflicting (or potentially conflicting) access to the same memory locations, then the results of those transactions are committed and update the architectural system state. If there is a conflict, then the transaction aborts and saved previous state data is used to "roll back" the state of the system to a point before the transaction was executed. The transaction may then be repeated sometime later to see if it completes without a conflict arising, may give rise to an exception, may be executed in a different way (e.g. using a lock mechanism) or otherwise processed depending upon the particular form of the system concerned.

Other types of conflicts that can cause a transaction to abort include exhaustion of resources for managing a transaction (e.g. temporary storage, depth counter for nested transactions, etc.) or an exception, such as a data abort (MMU fault), interrupt, etc. interrupting the transaction.

In one embodiment, a technique is provided for controlling debugging of program instructions executed by processing circuitry, where those program instructions include a transaction comprising a number (i.e. one or more) of program instructions that execute to generate speculative updates to state data, and where the processing circuitry commits those speculative updates if the transaction completes without a conflict. In addition to the processing circuitry, the apparatus also has control storage to store at least one watchpoint identifier. The processing circuitry is arranged, when it detects a watchpoint match condition with reference to the at least one watchpoint identifier during execution of a program instruction within the transaction, to create a pending watchpoint debug event. However, the watchpoint debug event is not actually initiated at that point in time. Instead, the processing circuitry is responsive to execution of the transaction finishing to then initiate a watchpoint debug event for the pending watchpoint debug event. The transaction will finish when the last instruction within the transaction is executed, in one embodiment this final instruction taking the form of a transaction end instruction.

However, it is also possible for the transaction to abort, that is complete without finishing, due to a conflict. In the above embodiment, the processing circuitry is responsive to execution of the transaction being aborted to cancel the pending watchpoint debug event.

Accordingly, any watchpoint debug events arising from watchpoint match conditions detected during execution of instructions within the transaction are set as pending, but will only ever be initiated if the transaction finishes. Hence, this prevents any probe effect being introduced during execution of a transaction due to debugging activity. Furthermore, if the transaction in fact aborts, any pending watchpoint debug events are cancelled, and accordingly in that situation no watchpoint debug events are initiated.

In one embodiment, the apparatus may be arranged to always operate as outlined above. However, in an alternative embodiment the control storage of the apparatus further stores watchpoint configuration data to control watchpoint handling by the processing circuitry. The processing circuitry is then arranged, when the watchpoint configuration data has a first value and the watchpoint match condition is detected with reference to the at least one watchpoint identifier during execution of a program instruction within the transaction, to create a pending watchpoint debug event. However, when the watchpoint configuration data has a second value and the watchpoint match condition is detected with reference to the at least one watchpoint identifier during execution of a program instruction within said transaction, the processing circuitry instead initiates the watchpoint debug event.

Hence, in accordance with such an embodiment, configuration data can be used to either suppress the generation of watchpoint debug events during the processing of a transaction by creating pending watchpoint debug events, or to cause watchpoint debug events to be initiated as and when watchpoint match conditions are detected (with no pending watchpoint debug events being created). This allows flexibility in how watchpoint debugging is handled for the apparatus.

The watchpoint configuration data can take a variety of forms but in one embodiment comprises a watchpoint configuration bit which is set to the first value and is cleared to the second value. It will be appreciated that the value used to actually indicate the set condition and the clear condition can be varied dependent on embodiment. For example, in one embodiment a logic one value may be used to indicate the set state and a logic zero value may be used to indicate the clear state, whilst in an alternative embodiment a logic zero value can be used to indicate the set state, and a logic one value can be used to indicate the clear state.

In one embodiment, the processing circuitry is arranged when the watchpoint match condition is detected with reference to the at least one watchpoint identifier during execution of a program instruction that is outside said transaction, to initiate the watchpoint debug event. Hence, irrespective of the setting or clearing of any watchpoint configuration data, if a program instruction is outside of the transaction, and a watchpoint match condition is detected, the watchpoint debug event for that watchpoint match condition will always be initiated straight away without creating any pending watchpoint debug event.

The control storage can take a variety of forms but in one embodiment comprises a plurality of control registers, each watchpoint identifier being stored in one or more of the control registers in said plurality. In one embodiment each watchpoint identifier is stored across multiple registers, e.g. a pair of registers. One register may for example store a data address value forming part of the watchpoint identifier, whilst another register stores control data forming another part of the watchpoint identifier.

The watchpoint identifiers can take a variety of forms, but in one embodiment each watchpoint identifier comprises at least a data address value, and the watchpoint match condition comprises at least a condition that execution of the program instruction causes an access to that data address value to take place. In one embodiment the watchpoint match condition may be determined to arise when any access to that data address value takes place, irrespective of whether that is a read (load) access or a write (store) access. Alternatively, the watchpoint match condition may be arranged to only be detected for a particular type of access, for example a write access to the data address value. The above-mentioned control data that may be included as part of the watchpoint identifier can specify such constraints, hence identifying whether the watchpoint is on reads, writes, or both, and may also indicate other control information, such as whether the watchpoint is enabled.

In one embodiment, the apparatus further comprises transaction tracking circuitry to track whether the processing circuitry is executing a program instruction within the transaction or a program instruction outside the transaction. This enables the processing circuitry to readily determine whether the program instruction that it is currently executing is within the transaction or outside the transaction, and hence whether a pending watchpoint debug event needs to be created or not when a watchpoint match condition is detected.

In one embodiment, the processing circuitry may be arranged to execute program instructions that include a plurality of nested transactions. In such embodiments, the transaction tracking circuitry can be arranged to implement a mechanism to keep track of where within the nested transactions execution currently is, and hence provide the processing circuitry with an indication as to whether the current program instruction is still within the transaction or not. In one embodiment, the transaction tracking circuitry maintains at least one counter to track progress through the plurality of nested transactions, so as to enable the processing circuitry to determine when execution of the plurality of nested transactions has finished. This provides a simple and effective mechanism for keeping track of whether the program execution is still within the plurality of nesting transactions.

Due to the fact that watchpoint debug events are not always initiated as soon as the watchpoint match condition is detected, but in some instances pending watchpoint debug events are instead created for use in later generating watchpoint debug events when a transaction has finished, it may be that at the time a debugger is analysing the watchpoint debug event, it will not immediately be apparent where the watchpoint match condition was detected within the transaction. In one embodiment, the processing circuitry is arranged to store, in association with the pending watchpoint debug event, syndrome information indicative of where within the transaction the watchpoint match condition was detected, the syndrome information being available for analysis by a debugger handling the watchpoint debug event subsequently initiated when the execution of the transaction finishes. The syndrome information can take a variety of forms but in one embodiment can provide an indication of the program counter value at the time the watchpoint match condition was detected that gave rise to the pending watchpoint debug event. By making this syndrome information available for analysis by the debugger when the watchpoint debug event is subsequently handled, this enables the debugger to determine where within the transaction the watchpoint match condition was detected.

Particular embodiments will now be described with reference to the Figures.

FIG. 1 schematically illustrates a stream of program instructions 2 which may be executed by processing circuitry. It will be appreciated that this stream of program instructions may be one executing thread within a multi-threaded system. Alternatively, the stream of program instructions may be the only thread of program instructions executing. Within the stream of program instructions illustrated in FIG. 1, there are included a transaction start instruction TStart and a transaction end instruction TEnd. These instructions respectively indicate the boundaries of a transaction comprising instructions IA, IB, IC and ID. These instruction delimited by the TStart and the Tend are executed by the processing circuitry to generate speculative updates to state data. These speculative updates are stored within memory or cache, or within other storage resources of the system (e.g. shadow registers, special purpose memory permitting roll back, and the like) until it is determined that the transaction has completed without a conflict at which point the speculative updates are committed to the system update the architectural state of the system with the stored roll back data then being discarded freeing up the associated memory resource to support a further transaction).

Figure 2A:
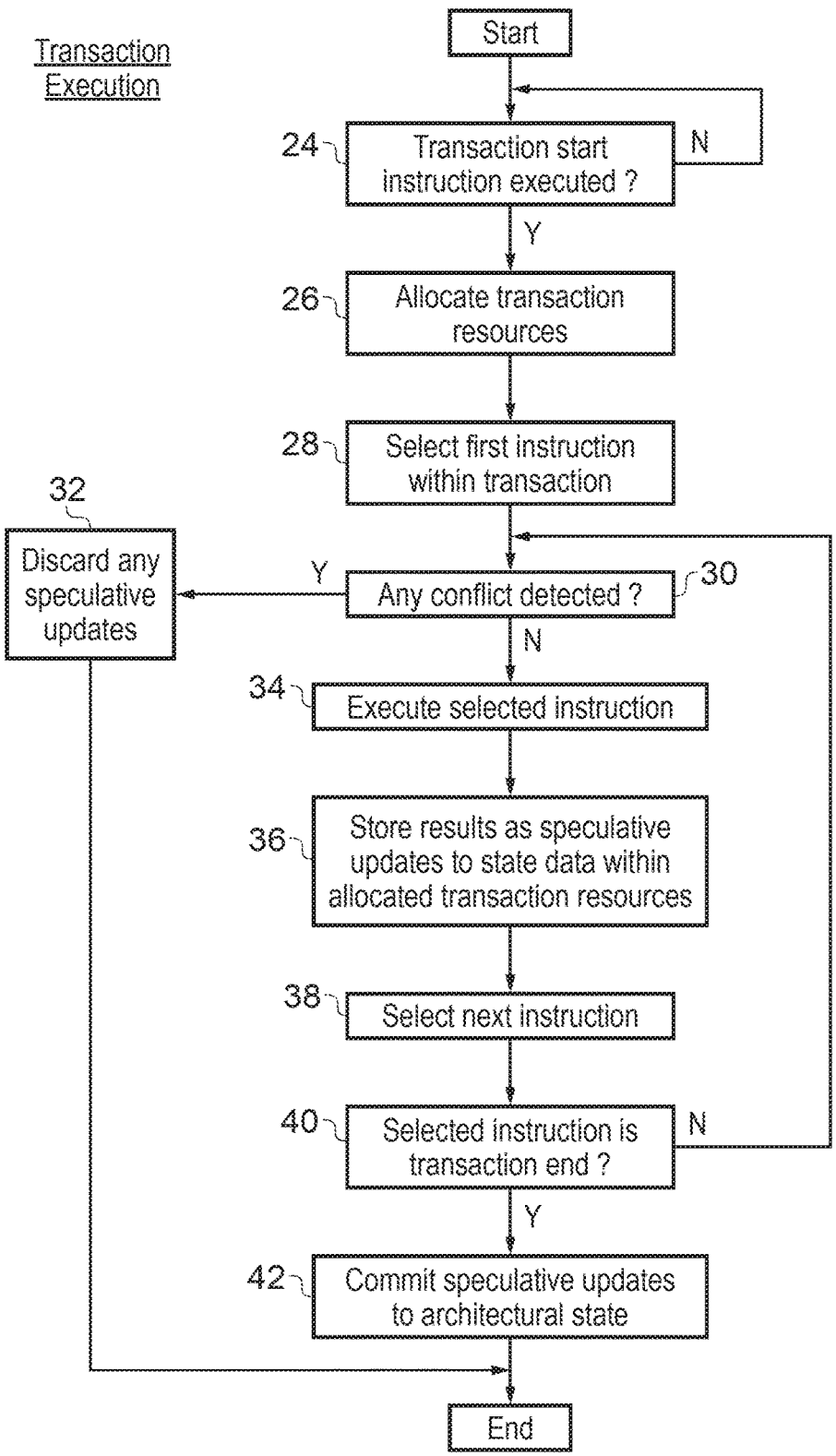
FIGS. 2A and 2B are flow diagrams schematically illustrating transaction execution.

FIG. 2A is a flow diagram schematically illustrating the execution of a transaction comprising multiple program instructions. At step 24 processing waits until a transaction start instruction (TStart) is executed. Step 26 then allocates transaction resources to be used, for example, resources to store the speculative updates to state data prior to the transaction completing. Step 28 selects the first instruction within the transaction. Step 30 determines whether or not there are any conflicts detected at that time. If there are any such conflicts detected, then step 32 serves to discard any speculative updates, jump to a fix-up routine (or otherwise indicate to the software that the transaction has failed) and return the transaction resources allocated at step 26 for use in other transactions.

If there are no conflicts detected at step 30, then step 34 serves to execute the selected instruction. Step 36 then stores the results of the execution at step 34 as speculative updates to state data within the allocated transaction resources. Step 38 selects a next instruction. Step 40 determines whether or not the selected instruction is a transaction end instruction (TEnd). If the instruction is not a transaction end instruction, then processing returns to step 30. If the determination at step 40 is that the selected instruction is a transaction end instruction, then step 42 serves to commit the speculative updates stored within the allocated transaction resources so as to update the architectural state of the system.

Figure 2B:
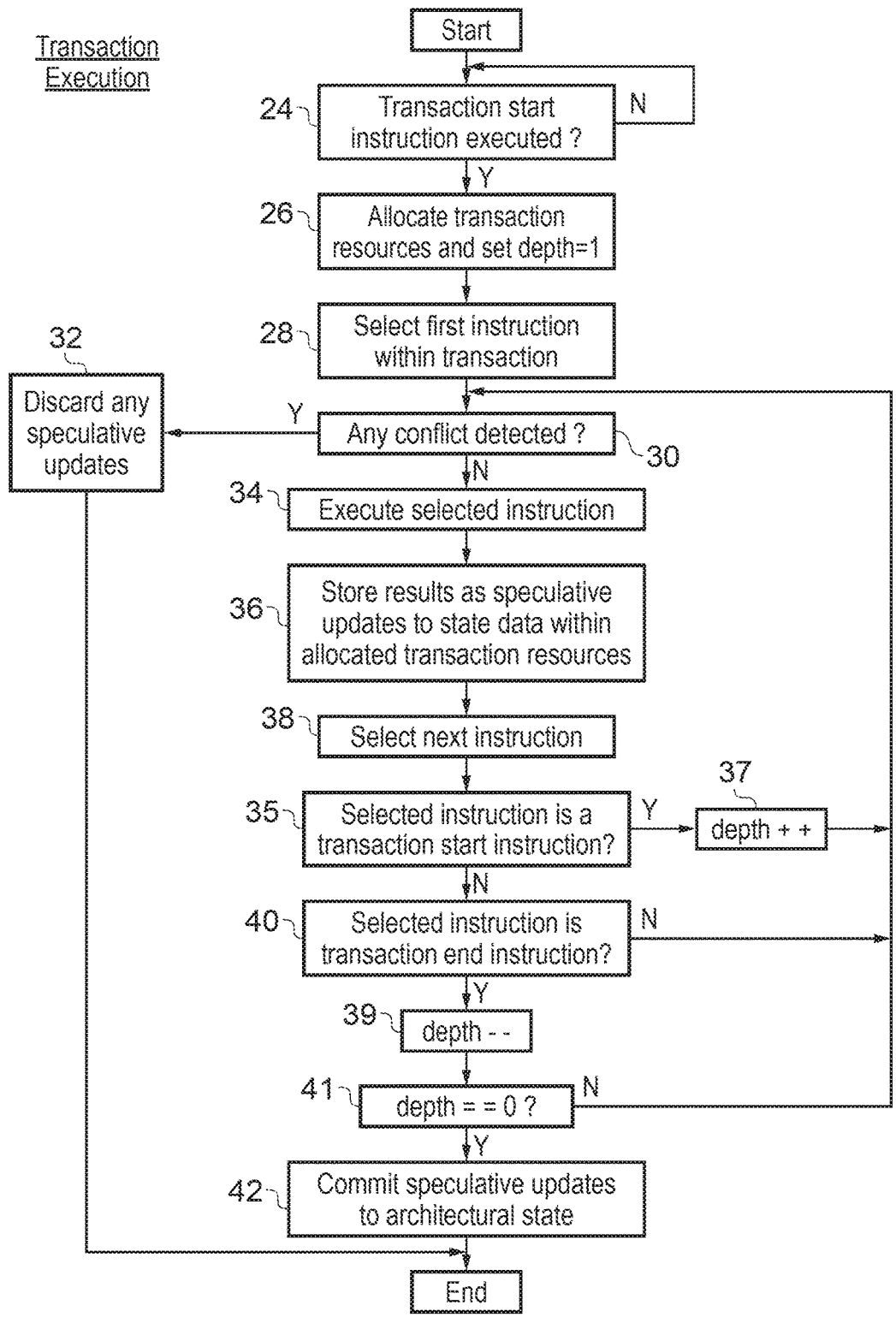

FIG. 2B is a flow diagram schematically illustrating the transaction execution of FIG. 2A modified to support flat transaction nesting. At step 26 a transaction nest depth counter is set to "1" when the transaction resources are allocated. After the next instruction is selected at step 38, step 35 determines if the selected instruction is a transaction start instruction. If the selected instruction is a transaction start instruction, then step 37 serves to increment the depth counter and processing returns to step 30.

If the determination at step 35 is that the selected instruction is not a transaction start instruction, then step 40 determines if the selected instruction is a transaction end instruction. If the selected instruction is not a transaction end instruction, then processing returns to step 30. If the selected instruction is a transaction end instruction, then step 39 decrements the depth counter and step 41 determines if the depth counter has a value equal to zero. If the depth counter does not equal zero, then processing again returns to step 30. If the depth counter does equal zero, then processing proceeds to step 42 as in FIG. 2A.

The action of FIG. 2B is to track the flat nested transaction depth and to commit the speculative updates stored in the allocated transaction resources, in response to the transaction started at step 24, when that same transaction is ended. In one embodiment, an abort serves to abort all nested transactions. It is also possible that other example embodiments may support true nesting of transactions.

Figure 3A:
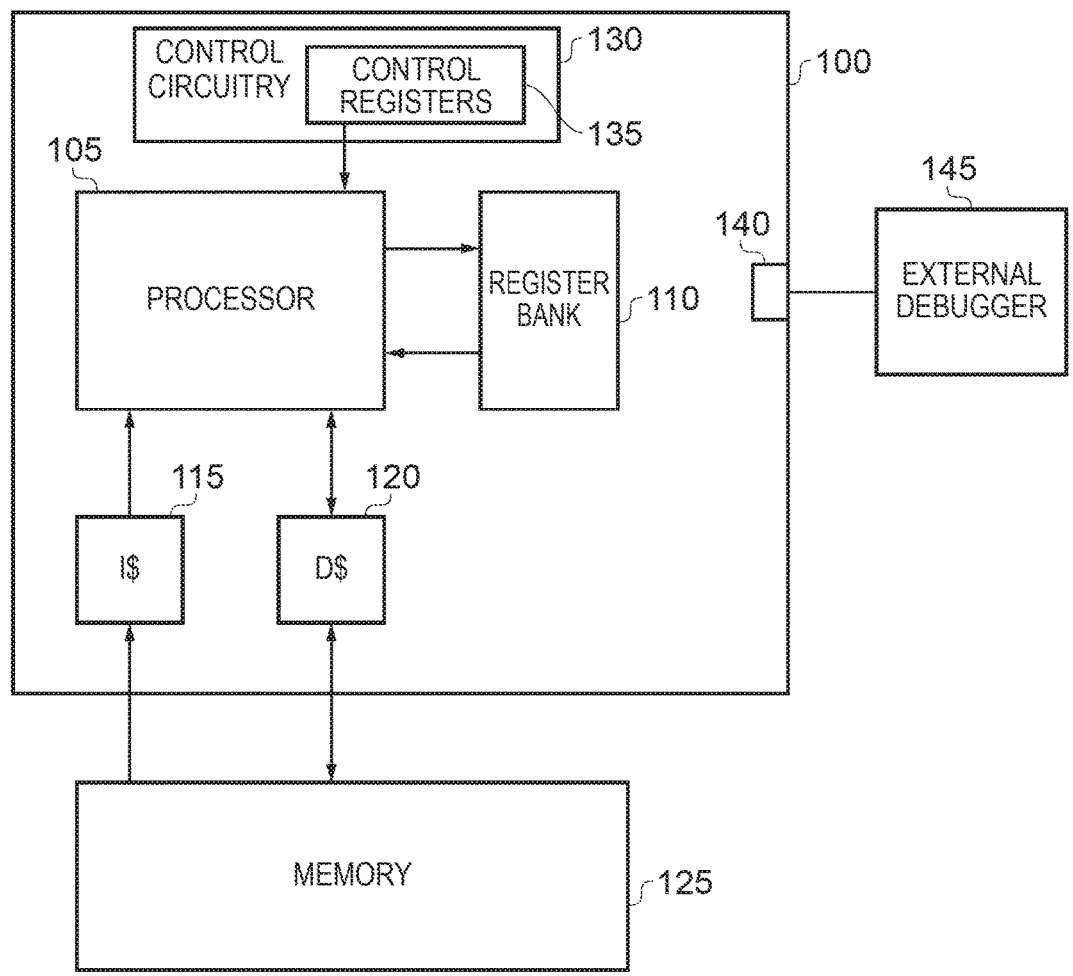
FIG. 3A is a block diagram of an apparatus in accordance with one embodiment.

FIG. 3A is a block diagram illustrating an apparatus 100 in accordance with one embodiment, that may be used to execute program instructions including one or more transactions. The program instructions will be stored in memory 125, and typically retrieved via one or more levels of instruction cache 115 for forwarding to the processor 105 for execution. During execution, the processor has access to a register bank 110 used to store values used by the processor during executing the instructions. The processor will also load data values from the data cache 120 and store data values to the data cache 120, the data cache potentially involving multiple levels of cache, and being coupled to the memory 125. Typically load instructions will be used to load data values from the data cache 120 into the register bank 110, and store instructions will be used to store data values from the register bank 110 back to the data cache 120.

Control circuitry 130 is also provided for controlling the operation of the processor, the control circuitry including one or more control registers 135 whose contents are referenced by the processor to control the operations performed by the processor. Some of the control registers may be debug control registers that an external debugger 145 can access via a debug port 140 on the apparatus 100 in order to control certain debugging activity of the program instructions being executed by the processor. The debug port 140 can also be used by the external debugger 145 to retrieve certain system state information maintained within the apparatus during execution of the instructions, for analysis during debugging activities.

Figure 3B:
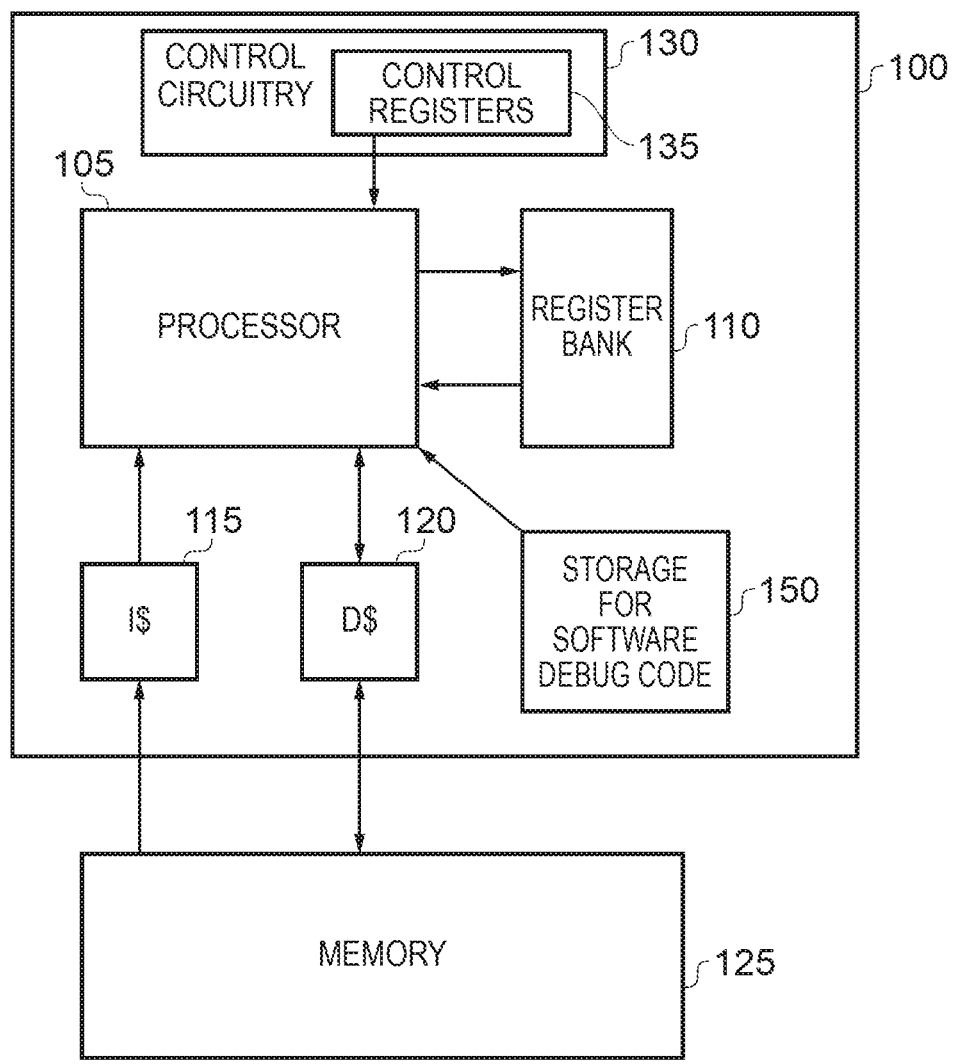
FIG. 3B is a block diagram of an apparatus in accordance with an alternative embodiment.

Whilst in FIG. 3A the debugger is an external debugger 145, for example a computer running suitable debugging software, in an alternative embodiment the debugger may be implemented by software debug code stored within the apparatus 100, for example within the storage 150 shown in the embodiment of FIG. 3B. Debug exceptions can be issued by the processor during execution (at which point debug is typically disabled) to cause the software debug code to be run on the processor to perform certain debug operations, whereafter an exception return can then be used in order to branch back to execution by the processor of the program instructions from the instruction cache 115, with debug then being re-enabled at that point.

Figure 4:
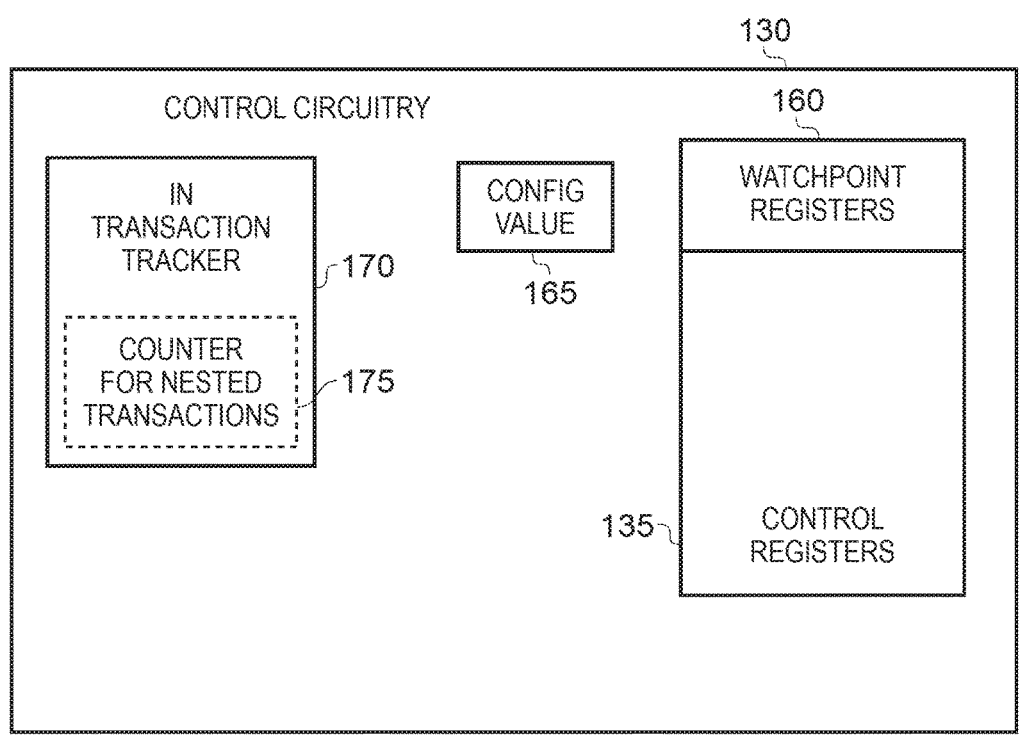
FIG. 4 is a diagram illustrating in more detail the control circuitry of FIGS. 3A and 3B.

FIG. 4 is a diagram illustrating in more detail the control circuitry 130 of FIG. 3A or 3B in accordance with one embodiment. The control registers 135 include a number of watchpoint registers 160 in which watchpoint identifiers can be stored. In one embodiment, each watchpoint identifier comprises a data address value, and may further comprise other control data such as whether the watchpoint is enabled, whether the watchpoint relates to reads, writes, or both, etc. The processing circuitry then references the contents of the watchpoint registers in order to detect when a data address being accessed during execution of a program instruction matches one of the data address values set in the watchpoint registers and also meets any other constraints specified by the control data. On detecting such a watchpoint match condition, the processing circuitry would normally then initiate a watchpoint debug event. However, in the embodiments described herein, the processing circuitry is arranged such that if a watchpoint match condition is detected whilst a program instruction is being executed in a transaction, it does not immediately initiate the watchpoint debug event, but instead creates a pending watchpoint debug event. This pending watchpoint debug event will capture the necessary information required for the watchpoint debug event, but the processing circuitry will defer initiating the actual watchpoint debug event until the transaction has finished. The transaction in one embodiment will finish with execution of the transaction end instruction, and at this point a watchpoint debug event will then be initiated for each pending watchpoint debug event that has been created during execution of the transaction. However, if the transaction is instead aborted without finishing, then the processing circuitry will cancel any pending watchpoint debug event.

In one embodiment, the processing circuitry can be arranged to always operate in the manner outlined above, and hence always create pending watchpoint debug events when watchpoint match conditions are detected during processing the transaction. However, in an alternative embodiment, as shown in FIG. 4, a configuration value can be stored within a configuration register 165 in order to selectively turn the above functionality on or off. In particular, when the configuration value has a first value, this will cause the processing circuitry to operate as outlined above, and create pending watchpoint debug events for each watchpoint match condition detected during processing of the transaction. However, if the configuration value has a second value, this functionality will effectively be turned off, and the processing circuitry will instead initiate watchpoint debug events for each watchpoint match condition as those watchpoint match conditions are detected, irrespective of whether the watchpoint match condition is detected during processing of an instruction within the transaction or outside of the transaction. The configuration register 165 can take a variety of forms, but in one embodiment may comprise a single bit field which is set to indicate the above mentioned first value and is cleared to indicate the above mentioned second value. In an alternative embodiment, the configuration value may be contained in the watchpoint control data 160, such that there is a configuration value for each watchpoint, and the processor uses the applicable configuration value for the matching watchpoint when deciding whether to create a pending watchpoint debug event or not.

In one embodiment the control circuitry 130 may also include an in transaction tracker 170 which is arranged to keep track of whether a current program instruction being executed is within a transaction or not. When executing a plurality of nested transactions such as discussed earlier with reference to FIG. 2B, the in transaction tracker 170 will incorporate a suitable mechanism to track the depth of nesting, and hence provide the processing circuitry with information about whether the current instruction being executed is within the transaction or not. In one particular embodiment, this can be achieved by providing a counter 175 to keep track of the nesting depth. For example, in one particular embodiment the counter may be incremented each time a new nested transaction is started, and decremented each time a transaction finishes due to execution of a transaction end instruction.

Figure 5:
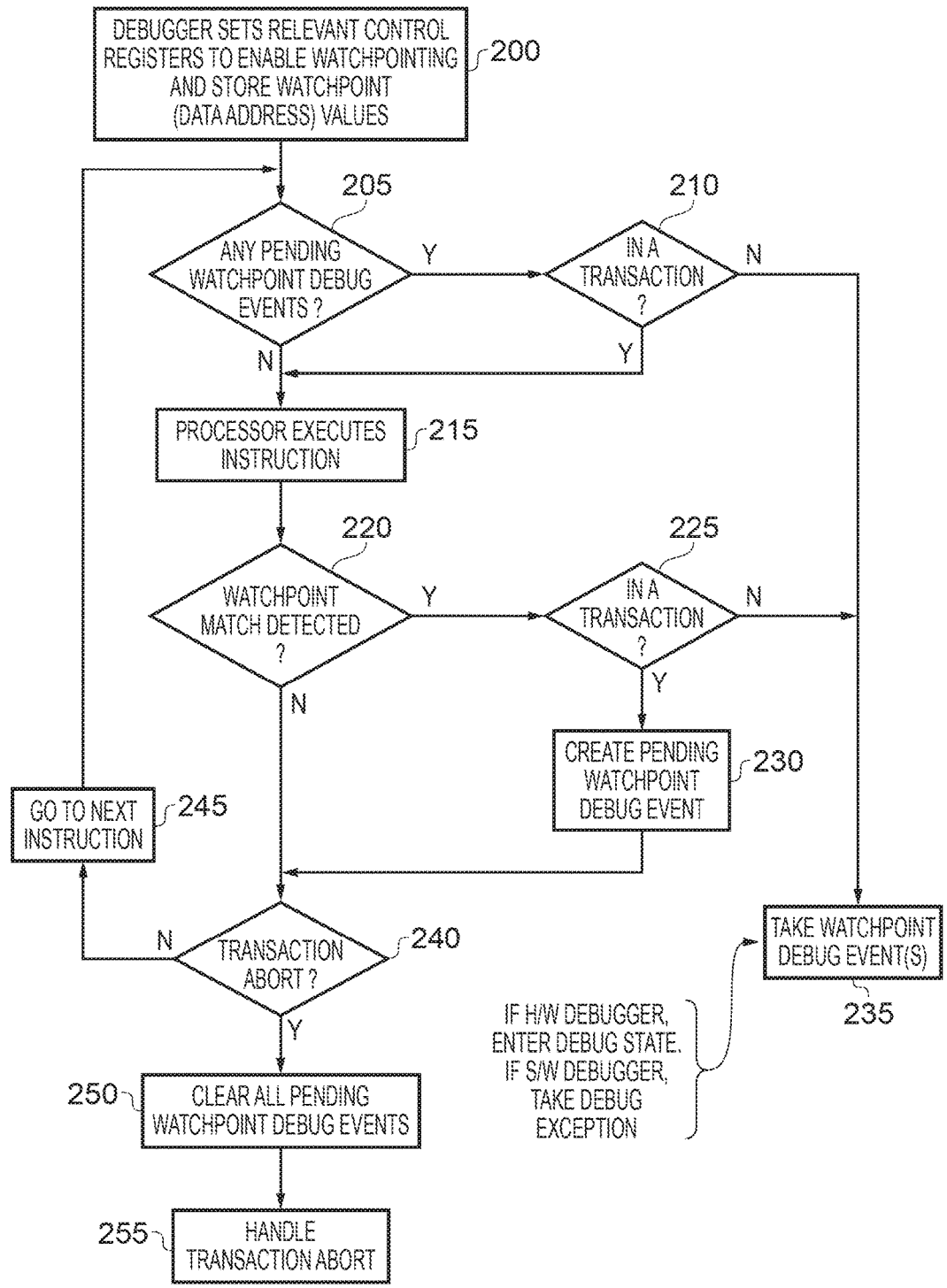
FIG. 5 is a flow diagram illustrating a debug control method in accordance with one embodiment.

FIG. 5 is a flow diagram illustrating the watchpoint debugging control method employed in accordance with one embodiment. At step 200, the debugger sets the relevant control registers to enable watchpointing and store the required watchpoint values, as mentioned earlier these typically being data address values access to which is required to trigger a watchpoint debug event and any related control data (such as whether the watchpoint relates to a read, a write, or both). The process then proceeds to step 205, where it is determined whether there are any pending watchpoint debug events already created. If so, the process proceeds to step 210, where it is determined whether the current instruction is within a transaction. If it is then the process proceeds directly to 215 where the processor executes the instruction. Alternatively, if there are no pending watchpoint debug events, the process proceeds directly from step 205 to 215.

If at step 210 it is determined that the instruction is not within the transaction, then this means that the transaction has finished, and accordingly the pending watchpoint debug events detected at step 205 should now be converted into actual watchpoint debug events. Accordingly, the process proceeds to step 235 where the required watchpoint debug event(s) are taken. When adopting the hardware debug approach of FIG. 3A, the watchpoint debug event(s) may be taken by entering the debug state. When adopting the software debugger approach of FIG. 3B, then a debug exception may be taken for the watchpoint debug event(s).

Returning to step 215, after the processor executes the instruction, then it is determined at step 220 whether a watchpoint match condition has been detected. If not, it is then determined at step 240 whether the transaction has aborted, and assuming it has not then at step 245 the program counter is updated to point at the next instruction, and the process returns to step 205.

If it is detected at step 240 that a transaction abort has occurred, then any pending watchpoint debug events that have been created are cleared at step 250, whereafter at step 255 the transaction abort is handled, for example by executing appropriate abort handling code.

If at step 220 a watchpoint match is detected, then at step 225 it is determined whether the instruction that has been executed is within a transaction. If not, then a watchpoint debug event is taken straight away, by virtue of the process proceeding to step 235. However, if it is determined that the instruction is within the transaction, then instead, at step 230, a pending watchpoint debug event is created, whereafter the process proceeds to step 240.

When creating the pending watchpoint debug event, in one optional embodiment the processing circuitry will also store some syndrome information which can later be used by the debugger when analysing the watchpoint debug event that will subsequently be issued when the transaction completes. In one embodiment, this syndrome information provides sufficient information to identify where within the transaction the watchpoint match condition was detected, and hence for example may provide an indication of the program counter value corresponding to the instruction whose execution gave rise to the watchpoint match condition being detected.

Figure 6:
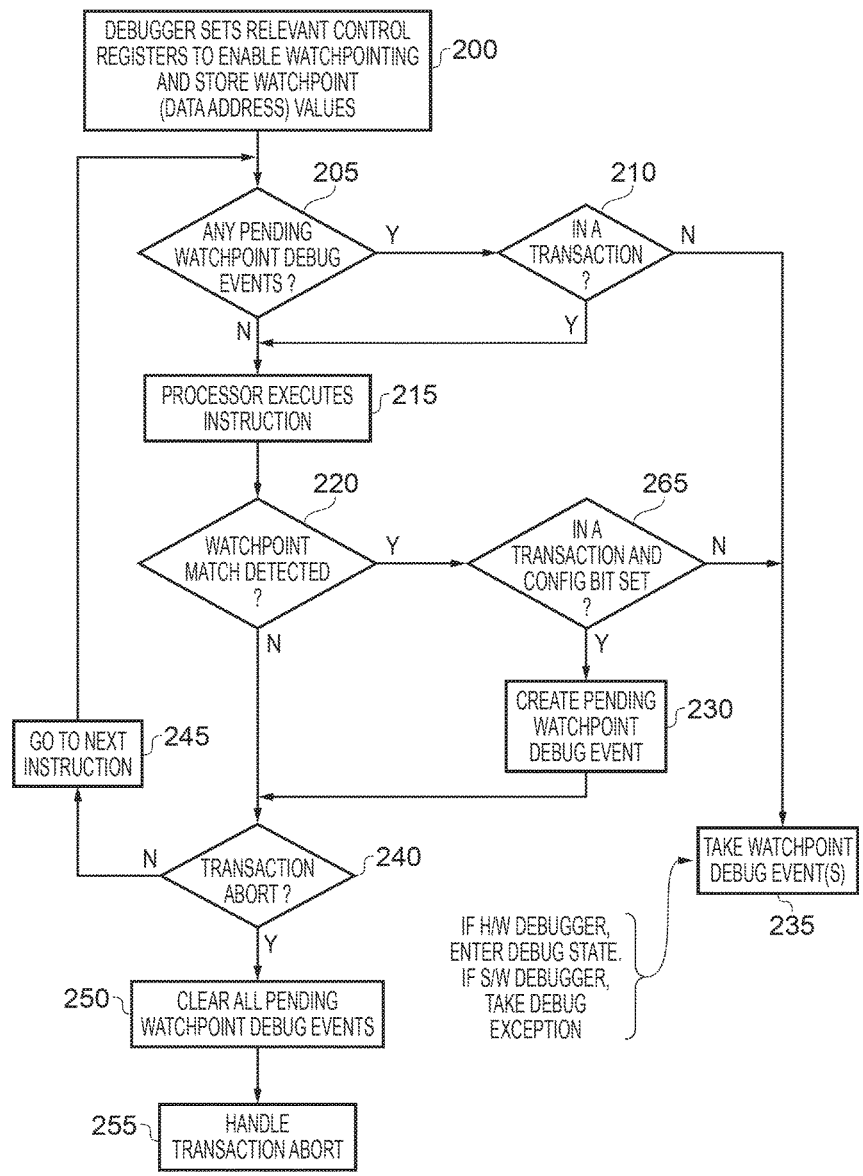
FIG. 6 is a flow diagram illustrating a debug control method in accordance with an alternative embodiment.

In FIG. 5, it is assumed that the configuration register 165 referred to in FIG. 4 is not used, and that the functionality of FIG. 5 is always employed. FIG. 6 illustrates an alternative flow which may be adopted when the configuration register is also used to enable the watchpoint deferring functionality to be turned on and off. As will be seen from a comparison of FIG. 5 with FIG. 6, the flow is essentially the same, but decision step 225 of FIG. 5 is replaced with decision step 265 of FIG. 6. In particular, at decision step 265, it is not only determined whether the instruction is within a transaction, but also whether the configuration value (in one embodiment a single bit value) is set. Only if the instruction is within the transaction and the configuration value is set will the process branch from step 265 to step 230. This means that if the configuration value is not set, then irrespective of whether the instruction is within the transaction or not, processing will proceed from step 265 directly to step 235, to cause the required watchpoint debug event to be taken immediately.

It will be appreciated from the above described embodiments that such embodiments allow watchpoint debugging to be performed, but provide a mechanism to prevent watchpoint debug events being taken whilst program instructions are being executed within the transaction. This prevents a probe effect being created during execution of a transaction due to such watchpoint debugging activity.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. An apparatus comprising:
    processing circuitry to execute program instructions including a transaction comprising a number of program instructions that execute to generate updates to state data and to commit said updates if said transaction completes without a conflict; and
    control storage to store at least one watchpoint identifier;
    the processing circuitry being arranged, when detecting a watchpoint match condition with reference to the at least one watchpoint identifier during execution of a program instruction within said transaction, to create a pending watchpoint debug event;
    the processing circuitry being responsive to execution of the transaction finishing to initiate a watchpoint debug event for the pending watchpoint debug event; and
    the processing circuitry being responsive to a conflict arising during execution of the transaction to cancel the pending watchpoint debug event.

2. An apparatus as claimed in claim 1, wherein:
    the control storage further stores watchpoint configuration data to control watchpoint handling by the processing circuitry,
    the processing circuitry being arranged, when the watchpoint configuration data has a first value and the watchpoint match condition is detected with reference to the at least one watchpoint identifier during execution of a program instruction within said transaction, to create the pending watchpoint debug event; and
    the processing circuitry being arranged, when the watchpoint configuration data has a second value and the watchpoint match condition is detected with reference to the at least one watchpoint identifier during execution of a program instruction within said transaction, to initiate the watchpoint debug event.

3. An apparatus as claimed in claim 2, wherein said watchpoint configuration data comprises a watchpoint configuration bit which is set to said first value and is cleared to said second value.

4. An apparatus as claimed in claim 1, wherein
    the processing circuitry is arranged, when the watchpoint match condition is detected with reference to the at least one watchpoint identifier during execution of a program instruction that is outside said transaction, to initiate the watchpoint debug event.

5. An apparatus as claimed in claim 1, wherein the control storage comprises a plurality of control registers, each watchpoint identifier being stored in one or more of the control registers in said plurality.

6. An apparatus as claimed in claim 5, wherein each watchpoint identifier comprises at least a data address value, and said watchpoint match condition comprises at least a condition that execution of the program instruction causes an access to that data address value.

7. An apparatus as claimed in claim 1, further comprising:
    transaction tracking circuitry to track whether the processing circuitry is executing a program instruction within said transaction or a program instruction outside said transaction.

8. An apparatus as claimed in claim 7, wherein:
    the program instructions executed by the processing circuitry include a plurality of nested transactions; and
    the transaction tracking circuitry maintains at least one counter to track progress through the plurality of nested transactions, so as to enable the processing circuitry to determine when execution of the plurality of nested transactions has finished.

9. An apparatus as claimed in claim 1, wherein the processing circuitry is arranged to store, in association with the pending watchpoint debug event, syndrome information indicative of where within the transaction the watchpoint match condition was detected, said syndrome information being available for analysis by a debugger handling the watchpoint debug event subsequently initiated when the execution of the transaction finishes.

10. A debug control method comprising:

employing processing circuitry to execute program instructions including a transaction comprising a number of program instructions that execute to generate updates to state data and to commit said updates if said transaction completes without a conflict;

storing at least one watchpoint identifier;

creating a pending watchpoint debug event on detecting a watchpoint match condition with reference to the at least one watchpoint identifier during execution of a program instruction within said transaction;

responsive to execution of the transaction finishing, initiating a watchpoint debug event for the pending watchpoint debug event; and responsive to a conflict arising during execution of the transaction, cancelling the pending watchpoint debug event.

11. An apparatus comprising:

processing means for executing program instructions including a transaction comprising a number of program instructions that execute to generate updates to state data, and for committing said updates if said transaction completes without a conflict; and control means for storing at least one watchpoint identifier;

the processing means, when detecting a watchpoint match condition with reference to the at least one watchpoint identifier during execution of a program instruction within said transaction, for creating a pending watchpoint debug event;

the processing means, responsive to execution of the transaction finishing, for initiating a watchpoint debug event for the pending watchpoint debug event; and the processing means, responsive to a conflict arising during execution of the transaction, for cancelling the pending watchpoint debug event.

* * * * *